3,513,238
ANTI-MICROBIAL COMPOSITIONS AND METHODS EMPLOYING N-(5-NITRO-2-FURFURYLIDENE)-3-AMINO-2-OXAZOLIDONE

Rolf Benno Kuhn, Mannheim-Gartenstadt, Peter Rieckmann, Mannheim-Waldhof, and Manfred Specker, Goppingen, Germany, assignors to Boehringer Mannheim Gesellschaft mit beschrankter Haftung, Mannheim-Waldhof, Germany, a corporation of Germany
No Drawing. Filed Jan. 28, 1966, Ser. No. 523,518
Claims priority, application Germany, Mar. 27, 1965, B 81,211
Int. Cl. A61k 27/00
U.S. Cl. 424—272          9 Claims

ABSTRACT OF THE DISCLOSURE

N-(5-nitro-2-furfurylidene)- 3 - amino-2-oxazolidone as an antimicrobial, antibacterial and anti-viral agent.

---

The present invention relates to and has for its object the provision of a series of novel therapeutic compositions useful for obtaining enhanced anti-bacterial, anti-microbial, and anti-viral effects. More particularly the invention relates to compositions of N-(5-nitro-2-furfurylidene)-3-amino-2-oxazolidone which form stable suspensions in water, such suspensions and the production of these new compositions.

N-(5-nitro-2-furfurylidene)- 3 - amino-2-oxazolidone is a medicament, commercially available under the names "Furazolidone" and "Furoxone."[1] N-(5-nitro-2-furfurylidene)-3-amino-2-oxazolidone has proved to be outstandingly useful in the prophylaxis and therapy of, inter alia, fowl pest, fowl typhus, and chronic fowl cholera.

Furazolidone is, however, strongly hydrophobic and substantially insoluble in water. Its use heretofore as a veterinary medicament has been limited to admixtures thereof with the animal food, i.e., as a so-called food pre-mix. Food pre-mixes of this type are required to have a uniformly distributed content of active material and can, therefore, only be produced on a large scale in special mixing machines. Different foodstuffs having different contents of active material are, of course, necessary, depending on the type of animal and the nature of the disease being treated.

Therefore, in veterinary practice, water-soluble forms of administration have always generally been preferred. An especial advantage of animal medicaments which are water-soluble or easily suspended in water is the fact that they can be accurately measured upon addition to the drinking water and can be administered in the desired optimum amounts related to the prevailing conditions.

It is known that water-insoluble hydrophobic substances can be made wettable by the use of wetting agents. In the case of Furazolidone, it is also possible to achieve a rapid wetting in this manner; however, it then sediments out very quickly. A rapid sedimentation of the active material is, however, just as dangerous as an agglomeration and floating about of unwetted active material on the surface of the water as both lead to a great variation in the dosage and an incomplete or excessive intake by the animals.

It is also known to stabilize suspensions by means of swelling agents. It has been established, however, that, in the case of Furazolidone, such high concentrations of swelling agents must be used that the suspensions would be too thick and could scarcely be regarded as constituting drinking water.

[1] Manufactured by the Norwich Pharmacal Company, Norwich, N.Y.

In accordance with the invention it has now been found that stable suspensions of Furazolidone are obtained, which satisfy all practical requirements, by admixing Furazolidone with 0.1–10% of a wetting agent and 0.1–10% of a dispersing agent.

For this purpose, there can, in principle, be used all powdery and pharmacologically compatible wetting and dispersing agents.

Exemplary of the wetting agents which can be used for the purposes of the present invention are fatty alcohol sulfonates and sulfates (e.g., "Texapon K–12," manufactured by Dehydag, Düsseldorf), sodium polyethylene-sulfonate, alkyl-polyethylene-sulfonates (e.g., "Hostapon KA" and "Hostapon KTW," manufactured by Farbwerke Hoechst, Frankfurt/Main), polyoxypropylene oxides (e.g., "Pluronic," manufactured by Wyandotte Chem. Corp., Wyandotte Mich.). Excellent results are obtained with alkyl aryl sulfonates, such as "Nekal A," "Nekal BX" (manufactured by Basf, Ludwigshafen/Rh.) and "Leonil DB" (manufactured by Farbwerke Hoechst, Frankfurt/M.), the sodium dodecyl-benzene-sulfonate commercially known as "Maranil" (manufactured by Dehydag, Düsseldorf) being especially preferred.

Suitable examples of dispersing agents for use herein include the salts of sulfite waste liquors, such as the sodium, ammonium, and aluminum lignin sulfonates. The sodium lignin sulfonate commercially available under the name "Darvan 2" (manufactured by Vanderbilt, New York) has proved to be especially useful.

In order to produce the new preparations according to the present invention, the components are intimately mixed with one another. For this purpose, the Furazolidone may be ground up together with the wetting and dispersing agents; for the grinding there can be used the conventionally available mills, such as ball mills, mortar mills, pin mills, hammer mills, and the like. However, it has proved particularly advantageous to use jet mills. In accordance with the invention, it is also possible to mix finely-ground Furazolidone (particle size 1–100$\mu$, preferably 10–20$\mu$) thoroughly with the wetting and dispersing agents.

The new preparations according to the present invention give stable, finely-divided suspensions not only in soft water but also in hard water in a great range of concentrations and particularly in the pharmacologically important range of 0.1 to 1%, the preferred range being 0.2 to 0.5%.

An especial advantage of the Furazolidone preparations according to the present invention is their wide and dependable applicability for various different kinds of animals. These new preparations can be added not only to the animals' drinking water but also to liquid foods. Thus, for example, they are suitable as additives to calf foods, whereby they can, if desired, be mixed with milk sugar, milk powder or suspendable calf food mixtures.

The following examples are given for the purpose of illustrating the present invention, but are not to be construed as limiting the spirit or scope of the invention in any way:

EXAMPLE 1

20 g. crystalline Furazolidone, which has been ground in a jet mill to a particle size of 10–20 $\mu$, was thoroughly mixed with 0.05 g. sodium dodecyl-benzene-sulfonate ("Maranil") and 0.6 g. sodium lignin sulfonate ("Darvan 2") in a mixer. 1 g. aliquots of this mixture were stirred into 2 to 5 liters water and immediately gave homogeneous suspensions, not only when soft water was employed but also with the use of hard water. After more than 12 hours of standing substantially no evidence of sedimentation was observed.

EXAMPLE 2

The procedure set out above was duplicated using a mixture of 20 g. Furazolidone, 0.03–0.06 g. sodium dodecyl-benzene-sulfonate ("Maranil") and 0.4–0.8 g. sodium lignin sulfonate ("Darvan 2") with completely identical results.

EXAMPLE 3–8

The following preparations were produced and stable aqueous suspensions prepared therefrom by following the procedure set out in Example 1.

(3)

| | G. |
|---|---|
| Furazolidone | 20 |
| Sodium lignin sulfonate | 0.6 |
| Fatty alcohol sulfonate ("Texapon K–12") | 0.05 |

(4)

| | |
|---|---|
| Furazolidone | 20 |
| Sodium lignin sulfonate | 0.6 |
| Fatty alcohol sulfonate ("Texapon K–12") | 0.2 |

(5)

| | |
|---|---|
| Furazolidone | 20 |
| Sodium lignin sulfonate | 0.6 |
| Fatty alcohol sulfonate ("Texapon K–12") | 2 |

(6)

| | |
|---|---|
| Furazolidone | 20 |
| Sodium lignin sulfonate | 0.6 |
| Polyoxypropylene oxide ("Pluronic F–88") | 2 |

(7)

| | |
|---|---|
| Furazolidone | 20 |
| Sodium lignin sulfonate | 0.6 |
| Alkyl-polyethylene sulfonate ("Hostapon KA") | 0.2 |

(8)

| | |
|---|---|
| Furazolidone | 20 |
| Sodium lignin sulfonate | 0.6 |
| Alkyl aryl sulfonate ("Leonil DB") | 0.2 |

Thus, in accordance with the invention, it has now been found that the combination of pharmacologically-active Furazolidone with 0.1–10% of a wetting agent and 0.1–10% of a dispersing agent prepared by intimately admixing the components results in a preparation capable of forming a stable suspension in water. This effect is entirely unexpected from a consideration of the effects obtained by using the pharmacologically-active Furazolidone with either of the latter two components, i.e., wetting agent or dispersing agent separately.

For use, the compositions are prepared by adding the combination of Furazolidone, wetting agent and dispersing agent as set out above to water in an amount sufficient to produce a 0.1–1% suspension referred to the Furazolidone. The suspension can be used per se or can be diluted, for example, with further quantities of water to produce suspensions containing lesser amounts of active agent. It is, of course, possible to produce a concentrate suspension, i.e., a 10% or more suspension, and to dilute the resulting product to the desired concentration immediately prior to use. Suspensions are preferably prepared to contain about 0.1 to 1% of active ingredient, the latter constituting the preferred therapeutic range.

We claim:
1. A composition for forming stable aqueous suspensions when mixed with water comprising a mixture of 0.1–10% of N-(5-nitro-2-furfurylidene)-3-amino-2-oxazolidone having a particle size of about 1–100μ, 0.1–10% of a wetting agent selected from the group consisting of fatty alcohol sulfonates, fatty alcohol sulfates, sodium polyethylene sulfonates, alkyl polyethylene sulfonates, polyoxypropylene oxides and alkyl aryl sulfonates, and 0.1–10% of a dispersing agent selected from the group consisting of sodium, ammonium and aluminum lignin sulfonates.

2. A composition according to claim 1, wherein said wetting agent is sodium dodecyl-benzene-sulfonate.

3. A composition according to claim 1, wherein said dispersing agent is sodium lignin sulfonate.

4. A composition according to claim 1, wherein said wetting agent is sodium dodecyl-benzene-sulfonate and said dispersing agent is sodium lignin sulfonate.

5. A composition according to claim 1 wherein said wetting agent is present in an amount of from 0.25–10% and said dispersing agent in an amount of from 2–4%.

6. A stable aqueous suspension of the composition of claim 1.

7. A stable aqueous suspension of the composition of claim 1, wherein said N-(5-nitro-2-furfurylidene)-3-amino-2-oxazolidone is present in a concentration of 0.1–1%.

8. A method of treating fowl pest, fowl typhus and chronic fowl cholera comprising administering to said fowl via their drinking water or admixed with their food a stable aqueous suspension according to claim 6.

9. A method of treating fowl pest, fowl typhus and chronic fowl cholera comprising administering to said fowl via their drinking water or admixed with their food a stable aqueous suspension according to claim 6.

References Cited

UNITED STATES PATENTS

| 3,075,876 | 1/1963 | Stark et al. | 167—53.1 |
| 3,268,404 | 8/1966 | Banford et al. | 167—53.1 |
| 2,455,054 | 11/1948 | Geiger et al. | 167—53.1 |

OTHER REFERENCES

Condensed Chemical Dictionary, Rose, 1963, p. 411.
Ibid., p. 1089.
Ibid., p. 1045.
Pharmaceutical Dispensing, Martin, 1960, pp. 189–190.
Remington's Practice of Pharmacy, Martin et al., 1961, p. 229.
Surface Active Agents, Shwartz et al., 1949, pp. 236–237.

ALBERT T. MEYERS, Primary Examiner

S. J. FRIEDMAN, Assistant Examiner